Sept. 20, 1971                F. W. POLLMAN                3,606,600
                              HYDRAULIC MOTOR
Filed June 12, 1969                                    2 Sheets-Sheet 1
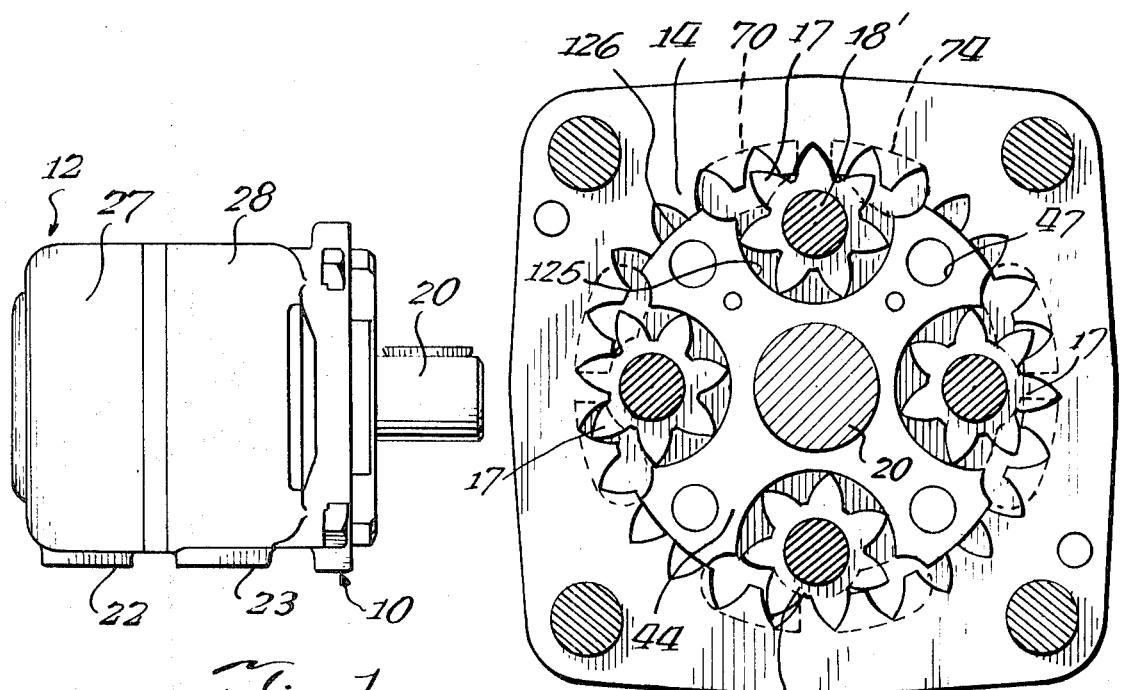
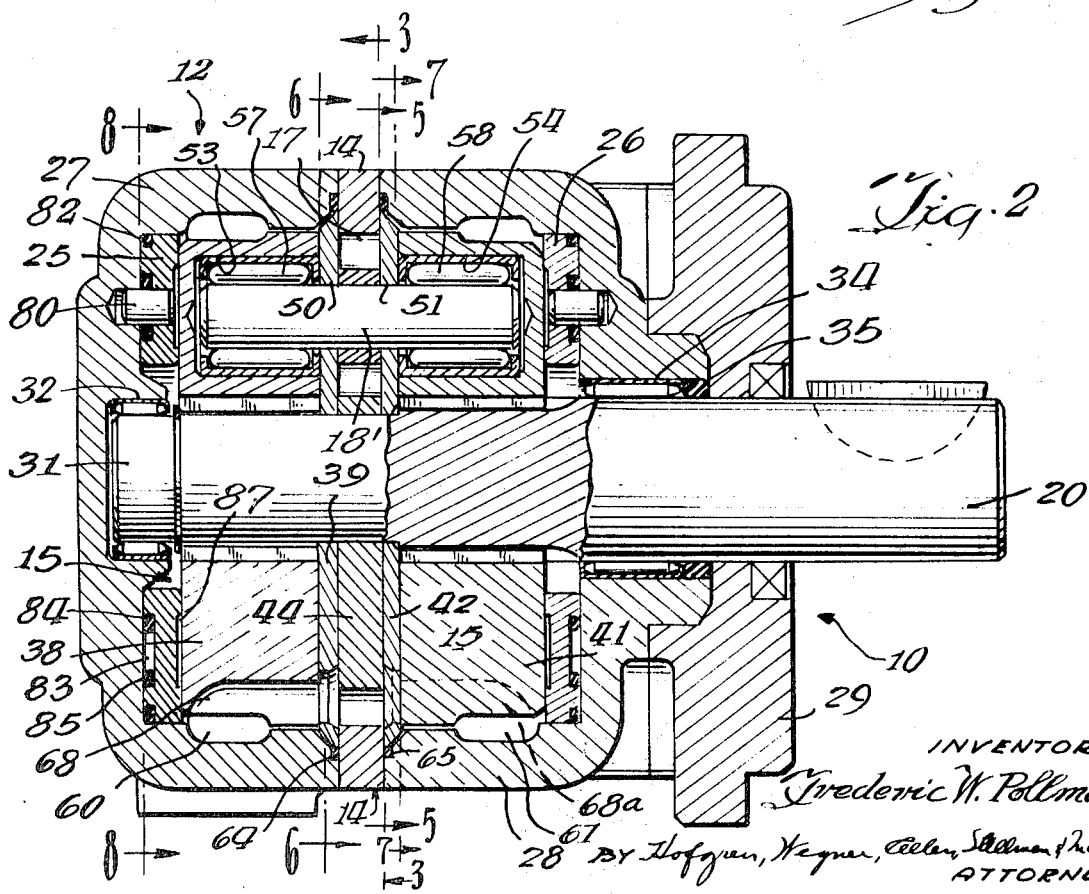
INVENTOR
Frederic W. Pollman
BY Hofgren, Wegner, Allen, Stellman & McCord
ATTORNEYS Sept. 20, 1971   F. W. POLLMAN   3,606,600
HYDRAULIC MOTOR
Filed June 12, 1969   2 Sheets-Sheet 2

3,606,600
HYDRAULIC MOTOR
Frederic W. Pollman, Rockford, Ill., assignor to
Sundstrand Corporation
Filed June 12, 1969, Ser. No. 832,637
Int. Cl. F01c 1/22, 19/08
U.S. Cl. 418—61                                       8 Claims

ABSTRACT OF THE DISCLOSURE

A low speed, high torque motor having a stationary ring gear with internal teeth and an output shaft mounted carrier which supports a plurality of planet gears that interengage the ring gear and form expanding and contracting fluid chambers as the carrier rotates with respect to the ring gear. The carrier has portions sealingly and slidably engaging the sides of the ring gear dividing the housing into chambers on either side of the gears, either of which may be the inlet or outlet chambers, depending upon the desired direction of rotation. Communicating with one of the chambers are a plurality of ports that extend axially through the carrier and communicate continuously with the expanding fluid chambers defined by the planetary gears and the ring gear, and communicating with the other chamber in the housing are a plurality of axially extending ports in the carrier that communicate with the contracting fluid chambers defined by the gears, there being provided pressure balancing plates at each axial end of the carrier for the purpose of pressure balancing the carrier.

BACKGROUND OF THE INVENTION

There has been an increasing demand for low speed, high torque motors for various applications, predominantly in the industrial and heavy equipment markets. One conventional form of such a drive includes a speed reduction gear box for the purpose of providing a high torque, low speed output from conventional hydraulic motors that have a direct relatively high speed output. The gear box increases the expense of the drive and also the envelope required therefor, so that it is undesirable in many applications.

There have been attempts to provide direct drive hydraulic high torque, low speed motors but to a large extent these devices have involved complex geometry requiring complicated and expensive mechanical connections and valving between the relatively rotating or orbiting members in the motors. The requirements for complicated driving connections and also for more complex valving arrangements, have also increased the overall size of these prior high torque, low speed motors.

The primary object of the present invention is to provide a high torque, low speed hydraulic motor that has a high hydraulic displacement per revolution and at the same time maintains a compact arrangement of elements which may be simply manufactured without detracting from the hydraulic efficiency of the motor.

SUMMARY OF THE INVENTION

In accordance with the present invention a high torque, low speed motor is provided which includes a stationary housing having an internally toothed ring gear fixedly mounted therein. Within the frame a gear carrier is mounted for rotation on a rotatable output shaft. The carrier supports a plurality of planet gears for rotation and in mesh with the internal ring gear. Two pressure balancing plates separate the ends of the gear carrier from the ends of the stationary housing.

The inlet ports for supplying fluid to the expanding tooth spaces are defined in the gear carrier on one side of the gears and the outlet ports are defined on the other side of the gears, also in the gear carrier. The ports in the carrier communicate with isolated axially spaced chambers formed within the housing around the gear carrier. These chambers in turn each communicate with one port leading from the housing, each of which may be either the inlet or outlet port depending upon the desired direction of output shaft rotation.

Since hydraulic fluid pressure is admitted under pressure directly within the housing, it imposes an axial load on the carrier. To balance this load the balancing plate at the opposite end of the carrier is supplied hydraulic fluid through passages in the carrier to hydrostatically balance the carrier within the housing.

As the carrier rotates the planet gears are driven in rotation about the axis of the output shaft and also about their own axes since they interengage the ring gear, defining with the ring gear expanding and contracting fluid chambers. With high pressure fluid being delivered to the expanding chambers the device operates as a low speed, high torque motor because the ring gear and each of the planet gears has a plurality of power cycles for each revolution of the carrier and output shaft driven thereby.

The present device facilitates the conversion of hydraulic power into high torque in a compact and efficient unit since both torque and hydraulic displacement are multiplied when using the ring gear and planet gear arrangement described above. The output shaft and the carrier assembly are in hydraulic balance which reduces the internal power loss through friction, and reduces the requirement for bulky supporting framework. Thus, the hydraulic imbalance on the moving parts of the device is limited to a nominal radial force on the planet gears which can be adequately resisted by anti-friction bearings. These factors increase the mechanical efficiency in converting hydraulic power to mechanical power.

A further advantage obtains from the fact that the individual parts are not subjected to high rotational or orbital speeds as in other types of high torque, low speed motors. This is true since most of the power is developed through displacement multiplication rather than torque multiplication, i.e. speed reduction. This has the additional advantage of permitting the device to operate at a lower noise level.

Several features of the device also have applications in both torque amplifiers and proportional directional control units having applications in vehicle power steering systems.

BRIEF DESCRIPTION OF THE DRAWINGS

FIG. 1 is a front elevation of the present hydraulic motor;

FIG. 2 is a longitudinal cross section of the motor shown in FIG. 1;

FIG. 3 is a sectional view taken generally along line 3—3 of FIG. 2 showing the planetary motoring gears;

DETAILED DESCRIPTION OF THE PREFERRED EMBODIMENT

Figure 4:
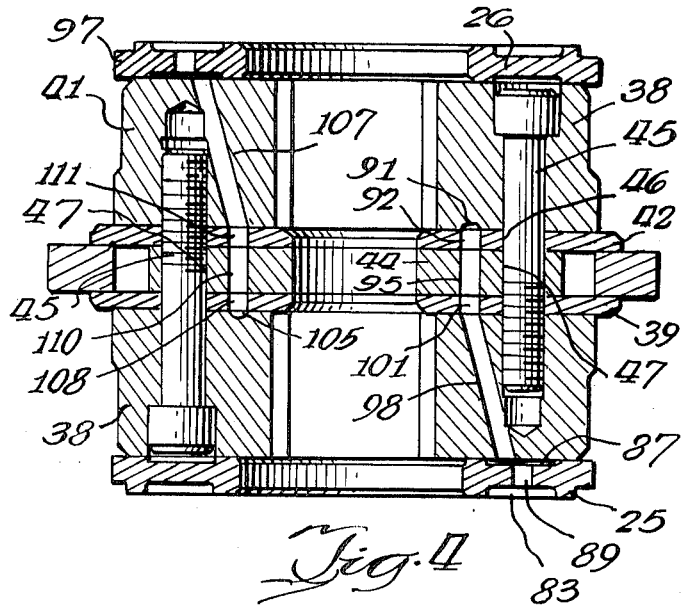
FIG. 4 is a fragmentary sectional view taken in a plane extending through the axis of the present motor.

Referring to the drawings and particularly FIGS. 1 and 2, the present hydraulic motor 10 is seen to consist generally of a rectangular housing 12, a stationary ring gear 14 fixed with respect to the housing, a rotary gear carrier assembly 15 rotatably mounted in the housing and having a plurality of rotatable planetary gears 17 carried thereby and interengaging the ring gear 14 as shown more clearly in FIG. 3. The carrier 15 is splined to an output shaft 20 which provides the mechanical output from the motor 10. Housing 12 has a first port 22 on one side of the gears and a second port 23 on the other side of the gears, either of which may be the high pressure port depending upon the direction of rotation. Fluid supplied to either of the ports passes within the interior of the housing and through the carrier assembly 15 to the planetary gears 17 causing rotation of the gears which in turn causes rotation of the carrier assembly 15 and rotation of the output shaft 20.

Pressure balancing plates 25 and 26 are provided on either end of the carrier assembly 15 for the purpose of pressure balancing the carrier assembly and the output shaft within the housing 12.

Turning to a description of the device in more detail, the housing 12 is seen to include opposed cup shaped rectangular housing members 27 and 28 which are fastened together by suitable fastening members which extend through the ring gear 14 fastening the ring gear and the housing members together as a unit. Carried by the housing member 28 is a mounting flange 29 which has suitable apertures for mounting the motor on a frame or a portion of adjoining equipment (not shown).

The output shaft 20 has a pilot portion 31 at its left end which is rotatably supported in a bearing 32 mounted centrally in the housing member 27. Supporting the enlarged right end of the shaft 20 is a needle bearing assembly 34 seated within a central aperture in housing member 28. A suitable seal 35 is provided adjacent the bearing 34 for preventing flow from the interior of the housing 12.

The carrier assembly 15, drives the output shaft 20 in rotation and is seen to include an annular end member 38 and port plate 39 on one side of the gears as well as an annular end member 41 and port plate 42 on the other side of the gears. Between the port plates 39 and 42 is a spacer plate 44 which is slightly thicker than the gears 17 and 14. The end members 38, 41, the port plates 39, 42, and the spacer 44 are connected together as a unit by axially extending threaded fasteners 45 shown clearly in FIG. 4. Fasteners 45 extend through openings 46 in the port plates 39 and 42 and through openings 47 in the spacer 44.

The left end member 38 and the left port plate 39 are identical in construction to the right end member 41 and the right port plate 42, so that it should be understood that the following description of the end member 38 and port plate 39 applies as well to the end member 41 and port plate 42.

The planet gears 17 are supported on shafts 18′ which extend through apertures 50 and 51 in port plates 39 and 42, respectively, into large dead ended bores 53 and 54 in the end members 38 and 41, respectively, which have bearings 57 and 58 seated respectively therein which support shafts 18′ for rotation. It should be understood that the assemblies associated with each of the shafts 18′ and gears 17 are identical and the above description applies to each of the gear assemblies shown in the drawings. While four gears 17 are shown, there may be more or less.

The hydraulic motor 10 is constructed so that fluid flows into one of the ports 22, 23, into the interior of the housing 12, axially through one of the end members 38, 41, through the individual gear motors defined by the gears 14 and 17, axially through the other end member 38, 41 on the other side of the gears 17, into the adjacent interior of the housing 12 and out the other port 22, 23. Toward this end, the port plates 39 and 42 extend peripherally beyond the end members 38 and 41 and slidably engage the sides of the ring gear 14 dividing the interior of the housing 27 into annular chambers 60 and 61 on either side thereof around the end members 38 and 41, respectively. Chambers 60 and 61 communicate respectively with ports 22 and 23 in the housing 12. Seals 64 and 65 prevent external leakage.

Figure 6:
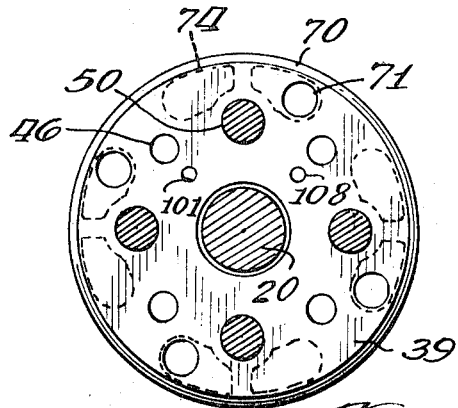
FIG. 6 is a subassembly view of one port plate taken generally along line 6—6 of FIG. 2.
Figure 7:
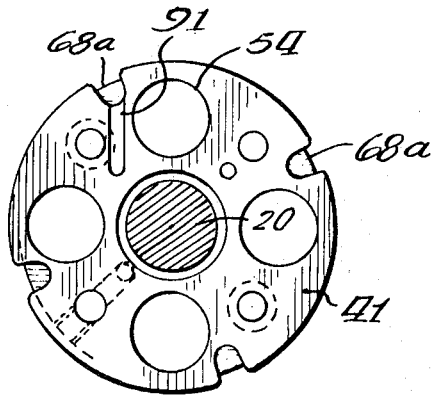
FIG. 7 is a subassembly view of a portion of the gear carrier taken generally along line 7—7 of FIG. 2.

For the purpose of conveying fluid to or from the chambers associated with the intermeshing gears 17 and 14 from the port 22 four axially and radially extending passages 68 are provided in the end member 38 spaced ninety degrees apart and offset somewhat with respect to radial planes through the axes of shafts 18′ as shown more clearly in FIG. 7 with respect to the right end member 41. Each of these passages communicates freely and continuously with a kidney shaped port 70 through passage 71 extending through port plate 39 as shown clearly in FIG. 6.

Assuming ports 70 are the high pressure intake ports, fluid supplied therethrough will drive the associated gear 17 in rotation and be expelled from the gears through kidney shaped ports 73 in the opposed port plate 42. Kidney shaped recesses 74 and 75 are provided in the port plates 39 and 42, respectively, but these do not extend through the port plates, and merely serve to form symmetrical fluid chambers with the ports which do extend through the port plates.

Fluid discharging through ports 73 exits through axial ports 77, one associated with each of the ports 73. Ports 77 communicate directly with axial passage 68a in the end member 41 which freely communicate with the periphery of the end member and the annular chamber 61. Assuming chamber 61 to be the discharge chamber fluid flows therefrom out port 23 from where it is returned to a tank or to a suitable pump (not shown), which supplies fluid to the motor 10.

It should be understood that there are four pasages 68 each associated with one of the ports 70 and one of the motoring gears 17, and four passages 68a in end cap 41 each associated with one of the ports 73 and one of the motoring gears 17.

Figure 8:
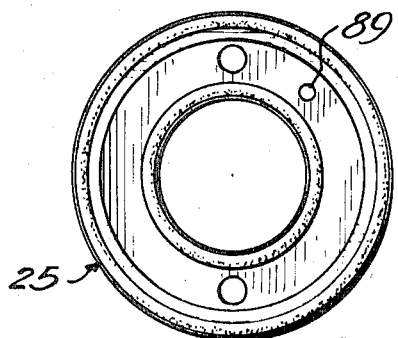
FIG. 8 is a subassembly view of the back side of one of the balancing plates taken generally along line 8—8 of FIG. 2.

The annular balancing plates 25 and 26 are provided on each end of the carrier assembly 15 for the purpose of pressure balancing the carrier assembly and shaft 20 within the housing 12. Each of the pressure balancing plates 25, 26 is identical in construction so that the description of one should be understood to apply to the other as well as. Referring to the pressure balancing plate 25 which is shown in FIG. 8 as well as FIG. 2, the plate is seen to be annular configuration rotatably fixed within the housing by pins 80 which permit limited axial movement of the balancing plate. Disposed on the periphery of the rear side of the balancing plate is sealing ring 82 which prevents fluid in chamber 60 from entering the rear side of the balancing plate across the periphery thereof. Formed in the rear surface of the balancing plate is a continuous annular recess 83 having seal rings 84 and 85 that provide the seals for preventing inward or outward radial fluid flow from the recess.

The front side of the balancing plate 25 is provided with an annular recess 87 which is also continuous. Recess 87 is slightly narrower than recess 83 to provide a small hydraulic imbalance on the plate 25 tending to urge it into a running contact with the end of the carrier assembly 15. The recesses 83 and 87 communicate through an axial passage 89 extending through the balancing plate so that both recesses are at equal pressure.

The recesses in each of the balancing plates 25, 26 communicate with the main port at the opposite end of the hydraulic motor 10 for the purpose of providing a hydraulic reaction force opposing high pressure fluid acting on the opposite end of the carrier assembly 15 when the opposite port is pressurized with high pressure fluid flowing to the motor. Toward this end, the annular chamber 61 within the right end of the housing communicates through one of the passages 68a with a radial groove 91 on the inner radial surface of end member 41 as shown in FIG. 7. Slot 91 communicates through an axial passage 92 in valve member 42 with an axial passage 95 in the spacer plate 44. Passage 95 communicates with a diagonally disposed passage 98 in end member 38 through axial passage 101 in valve plate 39 (see FIGS. 4 and 6).

Thus, when high pressure fluid is ported through port 23 to the motor pressurizing the main right chamber 61, a hydraulic force will result therefrom acting on the right end of the end member 41 tending to urge the entire carrier assembly 15 toward the left. The balancing plate 25 provides a pressure balancing force to the right that is equal and opposite to this force acting on the right end of the carrier assembly thereby to reduce axial thrust. To effect this the recess 87 is sized so that it provides a hydraulic pressure balancing area sufficient in size to provide a pressure balancing force which will be equal and opposite to the hydraulic force acting on the other end of the carrier assembly. Hydraulic fluid under pressure flows to the recess 87 through radial passage 91 and through the separator plate and through diagonal passage 98 which continuously communicates with recess 87 as shown in FIG. 4. As noted above, this high pressure fluid also enters recess 83 for the purpose of providing a slight hydraulic imbalance on plate 25 urging it toward the carrier assembly 15.

Similar fluid connections are provided between the left main housing chamber 60 and the balancing plate 26 for pressure balancing the right end of the carrier assembly 15 when high pressure fluid is ported into chamber 60 through main port 22.

Figure 5:
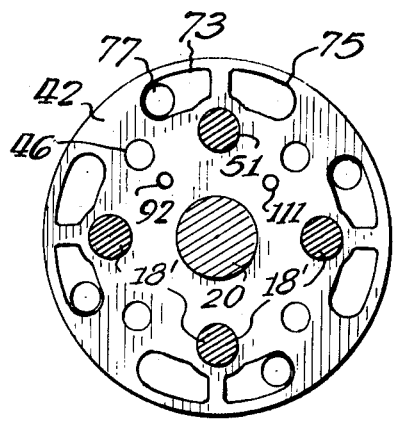
FIG. 5 is a subassembly view of one port plate taken generally along line 5—5 of FIG. 1.

Toward this end, and as shown in FIG. 4, a slot 105 (corresponding to slot 91) is provided in end member 38 continuously communicating with chamber 60 through one of the recesses 68 in the end member. Slot 105 communicates with diagonal passage 107 in valve member 41 through passage 108 in the valve plate 39, (FIG. 6) passage 110 in separator plate 44, and passage 111 (see also FIG. 5) in valve plate 42. Passage 107 supplies fluid under high pressure to the recesses associated with pressure balancing plate 26 whenever port 22 is the high pressure one of the ports and operates in the same manner as plate 25 except that it acts to urge the carrier assembly 15 to the left as shown in FIG. 2 whenever high pressure fluid is ported to chamber 60. The result of pressure balancing is to reduce wear between the surfaces subject to axial thrust.

Figure 9:
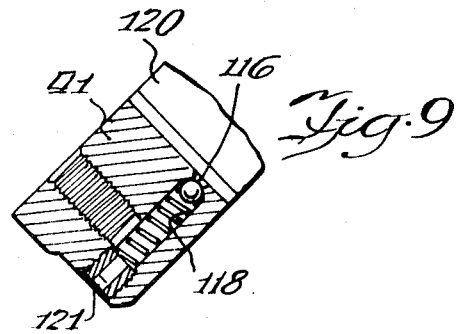
FIG. 9 is a fragmentary section taken generally along line 9—9 of FIG. 7 showing the low pressure leakage fluid return passage in the carrier.

To remove low pressure leakage fluid from the interior 120 of the carrier assembly, a check valve assembly 116 is provided in each of the end members 38, 41, as shown with respect to end member 41 in FIG. 9, for the purpose of permitting low pressure fluid from along shaft 20 to pass to the low pressure side of the motor 10. Toward this end a radial passage 118 is formed in each of the end members 38, 41 communicating at one end with the interior 120 of the carrier assembly along shaft 20 and at the other end with the associated chamber 60, 61. Check valve assembly 116 prevents high pressure fluid from flowing from the adjacent chamber when it is at high pressure to the interior 120 of the carrier assembly. Thus, when chamber 60 is at high pressure, the check valve assembly associated with end member 38 will be biased to its closed position while the check valve assembly 116 associated with end member 41 will open permitting leakage fluid within the interior 120 of the carrier assembly to escape through radial passage 118 into the chamber 61, which is then at low pressure, permitting leakage fluid to pass out discharge port 23.

While the operation of the present motor is believed obvious from the above description, the following description of the operation of the unit will provide a summary of the device. It should be understood that high pressure fluid may be delivered to either port 22 or port 23 depending upon the desired direction of rotation of motor output shaft 20. Assuming that high pressure fluid is ported to port 22, fluid will flow into chamber 60 and through axial passages 68, through passages 71 into ports 70 associated with each of the four gear motors in carrier 15. Fluid pressure in ports 70 causes expansion of the cooperating gear teeth of intermeshing gears 17 and 14. This will produce the counterclockwise rotation of gears 17 as viewed in FIG. 3 with the consequent driving of the planet shafts 18' in a clockwise direction about the axis of shaft 20 as viewed in FIG. 3 with the consequent driving of the output shaft 20 in the same direction. The spacer plate 44 has concave arcuate recesses 125 which have a close sealing clearance with the tips of the planet gears 17, and convex arcuate surfaces 126 which have a close sealing clearance with the tips of the internal gear 14. Fluid is discharged as the gear teeth pass across the ports 73 which then act as the outlet ports. Fluid from ports 73 passes through passages 77 in valve plate 42, through the axial passages 68a in end member 41, into annular chamber 61 and out the port 23 which then acts as a discharge port.

At the same time hydraulic fluid is ported from chamber 60 through the passages in the carrier assembly 15 to the pressure balancing plate 26 providing a pressure balancing force on the right end of the assembly 15 (as viewed in FIG. 2) opposing the force of hydraulic fluid in chamber 60 acting on the left end of the carrier assembly.

To rotate the output shaft 20 in the opposite direction of rotation, high pressure fluid is delivered to port 23 which in turn causes the pressurization of ports 73 and the consequent clockwise rotation of planets 17 driving the planet shafts 18' in a counterclockwise direction. Fluid is discharged from the planet gears 17 through ports 70, discharging through the chamber 60 to main port 22. In this case the pressure balancing plate 25 is supplied with high pressure fluid from chamber 61 through the passages in the carrier assembly 15 again for the purpose of pressure balancing the carrier assembly 15 and shaft 20.

I claim:

1. A hydraulic energy translating device, comprising: a first member, a second member rotatable with respect to said first member and defining expanding and contracting fluid chambers therewith, first port means on one axial side of said chambers for delivering fluid to the expanding chambers, and second port means on the other axial side of said chambers for conveying fluid from the contracting fluid chambers, said port means being defined in a rotatable carrier means supporting one of said members, each of said port means having axially extending port portions immediately adjacent said chambers and radially outwardly extending port portions communicating with said axially extending portions, both said axial portions and said radial portions being disposed in said carrier means.

2. A hydraulic energy translating device comprising: a first gear member, a second gear member having orbital movement with respect to said first gear member, said first and second gear members intermeshing and defining expanding and contracting fluid chambers upon relative orbital movement, carrier means fixed with respect to one of said members and extending axially on both sides of said gear members, axially extending inlet port means on one side of said gear members in said carrier means, and axially extending outlet port means on the other side of said gear members in said carrier means, said first gear member being a ring gear having internal gear teeth, said second gear member being a planet gear having external teeth, said carrier means having sealing means slidably engaging both sides of said ring gear member defining an inlet chamber around said carrier means on one side of said gear members and an outlet chamber around said carrier means on the other side of said gear members.

3. A hydraulic energy translating device, comprising: a first member, a second member rotatable with respect to said first member and defining expanding and contracting fluid chambers therewith, a carrier for one of said members having sealing means sealing said chambers, first port means on one axial side of said chambers for delivering fluid to the expanding chambers, second port means on the other axial side of said chambers for conveying fluid from the contracting fluid chambers, housing means surrounding said first and second members, an axial pressure balancing chamber adjacent the carrier on the side of said carrier opposite the high pressure one of said port means, and means for supplying fluid under pressure to said pressure balancing chamber to balance the axial force of high pressure fluid acting on said carrier from the high pressure port means.

4. A hydraulic energy translating device as defined in claim 3 wherein said balancing chamber is defined by a balancing plate engaging one side of the carrier, and said means for supplying fluid under pressure to said balancing plate includes passage means communicating with the high pressure one of said port means.

5. A hydraulic energy translating device as defined in claim 4, including a second pressure balancing plate on the opposite side of said first and second members, means for supplying fluid to said second balancing plate including passage means communicating with the other port means.

6. A hydraulic energy translating device comprising: a first gear member, a second gear member having orbital movement with respect to said first gear member, said first and second gear members intermeshing and defining expanding and contracting fluid chambers upon relative orbital movement, carrier means fixed with respect to one of said members and extending axially on both sides of said gear members and having means sealing said chambers, axially extending inlet port means on one side of said gear members in said carrier means, axially extending outlet port means on the other side of said gear members in said carrier means, housing means surrounding said gear members and said carrier means, said sealing means separating said housing means into axially spaced fluid chambers, one of said port means communicating with one of said chambers, the other of said port means communicating with the other of said chambers, balancing means for axially balancing said carrier means including a first pressure balancing plate at one end of said carrier means, means communicating with the port means on the opposite side of said gear members for supplying fluid under pressure to the first pressure balancing plate, a second pressure balancing plate at the other end of said carrier means, and means for supplying fluid under pressure to said second pressure balancing plate including means communicating with the other port means on the one side of said gear members.

7. A hydraulic motor, comprising: housing means, a ring gear having internal teeth fixed with respect to said housing means, an output shaft mounted for rotation in said housing means, a carrier mounted on said shaft and being rotatably fixed thereto, said carrier including two end members with a spacer member therebetween, said spaced member having a plurality of arcuate surfaces in the periphery thereof defining chambers within said carrier, each of said chambers having an externally toothed planet gear rotatably mounted therein, said planet gears having teeth interengaging said ring gear and defining expanding and contracting fluid chambers therewith, said carrier having annular portions slidably and sealingly engaging each side of said ring gear and dividing said housing means into first and second axially spaced chambers, a first port in said housing means communicating with one of said chambers in the housing means, a second port in said means communicating with the other of said chambers in said housing means, said housing chambers each surrounding said carrier end members, a plurality of axially extending inlet passages in one of said end members communicating with one of said housing chambers and the expanding fluid chambers, a plurality of axially extending inlet passages in one of said end members communicating with one of said housing chambers and the expanding fluid chambers, a plurality of outlet passages in the other of said end members communicating with the other housing chamber and the contracting fluid chambers, means for axially balancing said carrier including a first balancing plate engaging one end of said carrier, a second balancing plate engaging the other end of said carrier, and passage means in said carrier communicating the balancing surface of each of said balancing plates with the port on the opposite side of the gear members to balance the hydraulic force in the housing chambers on the opposite side adjacent the carrier.

8. A hydraulic energy translating device, comprising: housing means, stationary gear means in said housing means, a carrier rotatably mounted in said housing means and rotatably supporting at least one pinion gear interengaging said stationary gear, and defining therewith expanding and contracting fluid chambers, said carrier having seal means on the axial opposite sides of said chambers, high pressure port means in said housing means on one side of said seal means providing an axial thrust force on said carrier and seal means in one direction, and means for balancing said thrust force including a balancing chamber adjacent said carrier on the opposite side of the seal means from the high pressure port means, and means for supplying high pressure fluid to said balancing chamber.

References Cited

UNITED STATES PATENTS

| | | | |
|---|---|---|---|
| 1,906,896 | 5/1933 | Ayot | 192—61X |
| 2,240,874 | 5/1941 | Thomas et al. | 91—92X |
| 2,387,230 | 10/1945 | Bock | 192—61 |
| 2,396,149 | 3/1946 | Bock | 192—61 |
| 2,435,244 | 2/1948 | Stephens | 192—61X |
| 2,687,014 | 8/1954 | Tallada | 192—61X |
| 2,811,233 | 10/1957 | Hindmarch | 192—61 |
| 2,989,951 | 6/1961 | Charlson | 91—81X |
| 3,376,824 | 4/1968 | Turolla | 103—126L |
| 3,401,778 | 9/1968 | Ahlen | 103—126L |
| 3,461,992 | 8/1969 | Frasca | 192—61 |
| 2,681,621 | 6/1954 | Hedman | 418—196X |

ALLAN D. HERRMANN, Primary Examiner

U.S. Cl. X.R.

418—81, 131